(12) United States Patent
Mendel et al.

(10) Patent No.: US 10,876,614 B2
(45) Date of Patent: Dec. 29, 2020

(54) TRANSMISSION COMPONENT SET HAVING AN OUTPUT BEARING AND A HARMONIC DRIVE TRANSMISSION WHICH CAN BE MOUNTED THEREON

(71) Applicant: Harmonic Drive AG, Limburg/Lahn (DE)

(72) Inventors: Matthias Mendel, Limburg/Lahn (DE); Michael Schaffer, Niederbrechen (DE)

(73) Assignee: Harmonic Drive AG, Limburg/Lahn (DE)

( * ) Notice: Subject to any disclaimer, the term of this patent is extended or adjusted under 35 U.S.C. 154(b) by 489 days.

(21) Appl. No.: 15/558,100

(22) PCT Filed: Mar. 18, 2016

(86) PCT No.: PCT/EP2016/055946
§ 371 (c)(1),
(2) Date: Sep. 13, 2017

(87) PCT Pub. No.: WO2016/150844
PCT Pub. Date: Sep. 29, 2016

(65) Prior Publication Data
US 2018/0051789 A1    Feb. 22, 2018

(30) Foreign Application Priority Data
Mar. 23, 2015   (DE) ........................ 10 2015 104 308

(51) Int. Cl.
*F16H 1/32*    (2006.01)
*F16H 49/00*   (2006.01)
(Continued)

(52) U.S. Cl.
CPC ......... *F16H 49/001* (2013.01); *F16C 33/581* (2013.01); *F16C 43/06* (2013.01); *F16C 2361/61* (2013.01)

(58) Field of Classification Search
CPC ....... F16H 49/001; F16C 33/581; F16C 43/06
(Continued)

(56) References Cited

U.S. PATENT DOCUMENTS 1,035,463 A * 8/1912 Oldfield ................. F16C 43/06
384/508
2,143,091 A * 1/1939 Searles ................... F16C 43/06
384/508
(Continued)

FOREIGN PATENT DOCUMENTS

CN    201162803 Y    12/2008
CN    202851612 U    4/2013
(Continued)

OTHER PUBLICATIONS

Search Report issued in respect of Chinese patent application 201680017796.9.

*Primary Examiner* — William C Joyce
(74) *Attorney, Agent, or Firm* — Rogowski Law LLC

(57) ABSTRACT

A transmission component set has a bearing ring (1) and a strain wave gear mounted thereon. Said strain wave gear comprises an input or drive component (2), a flexible or resilient transmission component (4) having external teeth (3), and a gear (6) having an internal teeth (5). The transmission component (4) is fitted onto the drive component (2) and thereby is elliptically deformable such that the external teeth (3) of the transmission component (4) engage with the internal teeth (5) of the gear (6) in opposing areas of a major axis of the ellipse, wherein the gear (6) or the transmission component (4), via its bearing surface (7), can be mounted on a bearing surface (9) of the bearing ring (1) by means of rolling elements (8). The gear (6) or the transmission component (4) and the bearing ring (1) are each provided with at least one indentation or receptacle (10, 11). When the two indentations or receptacles (10, 11) are lined up in a corre-
(Continued)

sponding position relative to each other, the rolling elements (8) are inserted into an anti-friction bearing between the bearing surface (7) of the gear (6) or transmission component (4) and the bearing surface (9) of the bearing ring (1).

14 Claims, 13 Drawing Sheets

(51) Int. Cl.
  *F16C 43/06* (2006.01)
  *F16C 33/58* (2006.01)
(58) Field of Classification Search
  USPC .................................. 74/640; 384/507, 508
  See application file for complete search history.

(56) References Cited

U.S. PATENT DOCUMENTS

| | | | |
|---|---|---|---|
| 3,637,271 A * | 1/1972 | Bayard | F01D 25/16 384/462 |
| 4,196,947 A * | 4/1980 | Ziegler | B60B 33/0002 384/592 |
| 4,524,639 A * | 6/1985 | Carlson | F16H 49/001 74/640 |
| 4,825,720 A * | 5/1989 | Capdepuy | F16H 49/001 74/468 |
| 4,909,098 A * | 3/1990 | Kiryu | F16C 33/41 74/640 |
| 6,000,289 A | 12/1999 | Horiuchi | |
| 6,019,518 A | 2/2000 | Yoon | |
| 6,050,155 A | 4/2000 | Tortora | |
| 6,269,711 B1 * | 8/2001 | Tejima | F16H 49/001 384/512 |
| 6,866,608 B2 | 3/2005 | Shirasawa | |
| 7,905,326 B2 | 3/2011 | Kiyosawa | |
| 8,875,598 B2 | 11/2014 | Horiuchi et al. | |
| 2004/0048715 A1 | 3/2004 | Shirasawa | |
| 2005/0135720 A1 | 6/2005 | Ohno | |
| 2007/0281824 A1 | 12/2007 | Tezuka | |
| 2012/0085188 A1 | 4/2012 | Kurogi | |
| 2014/0047938 A1 | 2/2014 | Horiuchi | |
| 2016/0047451 A1 | 2/2016 | Hoshina | |
| 2016/0084367 A1 | 3/2016 | Murayama | |

FOREIGN PATENT DOCUMENTS

| | | |
|---|---|---|
| CN | 10353414 A | 1/2014 |
| DE | 2407477 A1 | 8/1975 |
| DE | 19938057 A1 | 2/2000 |
| DE | 102007025353 A1 | 12/2007 |
| DE | 19681201 B4 | 8/2010 |
| DE | 112009005020 T5 | 9/2012 |
| JP | 2000120811 A | 4/2000 |
| JP | 2002031150 A | 1/2002 |
| JP | 2005308131 A | 11/2005 |
| JP | 2008240831 A | 10/2008 |
| JP | 2010127452 A | 6/2010 |
| WO | 03050435 A1 | 6/2003 |
| WO | 2012157022 A1 | 11/2012 |
| WO | 2014181376 A1 | 11/2014 |
| WO | 20140203295 A1 | 12/2014 |

* cited by examiner

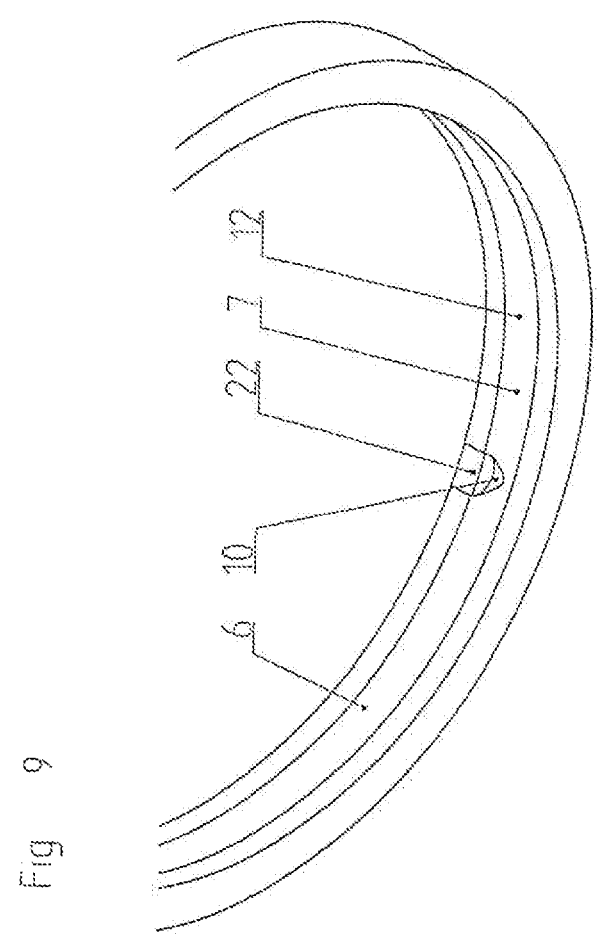

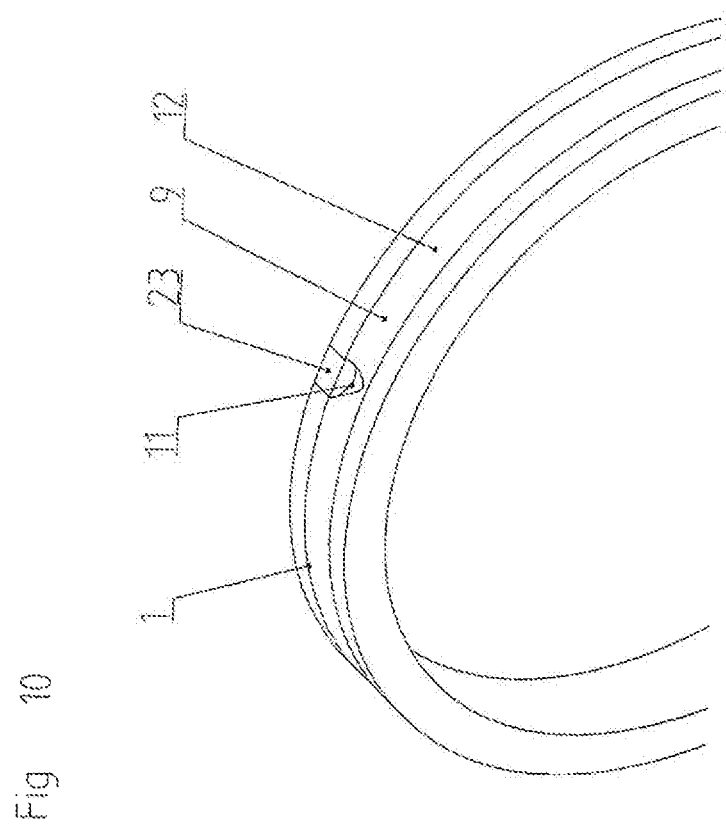

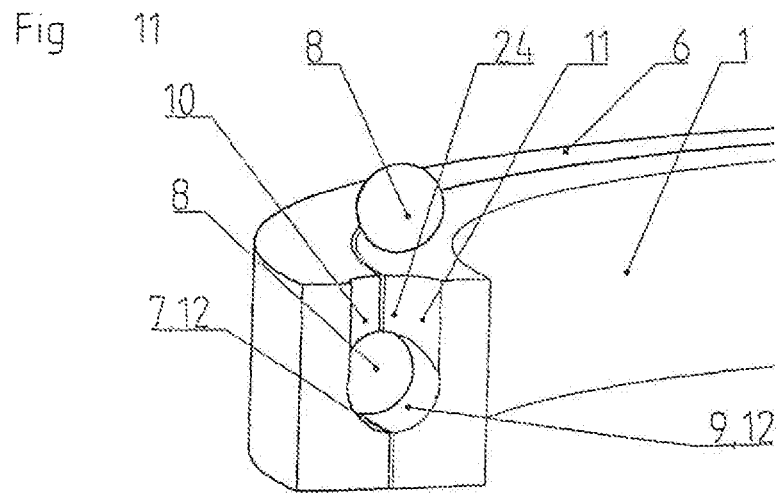
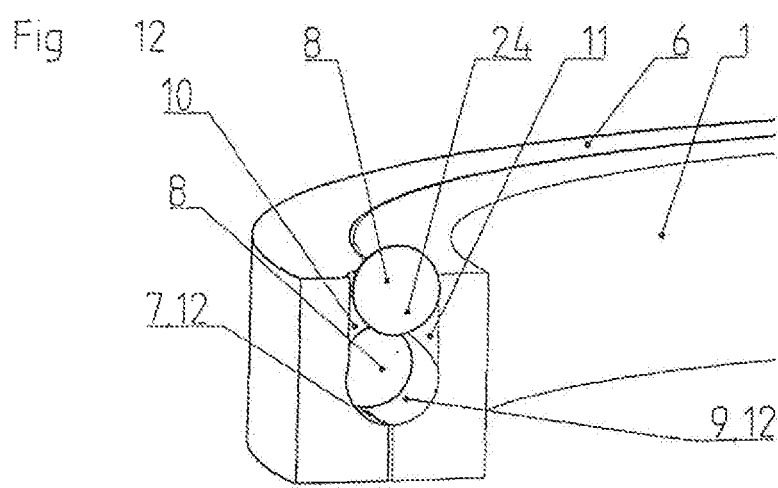
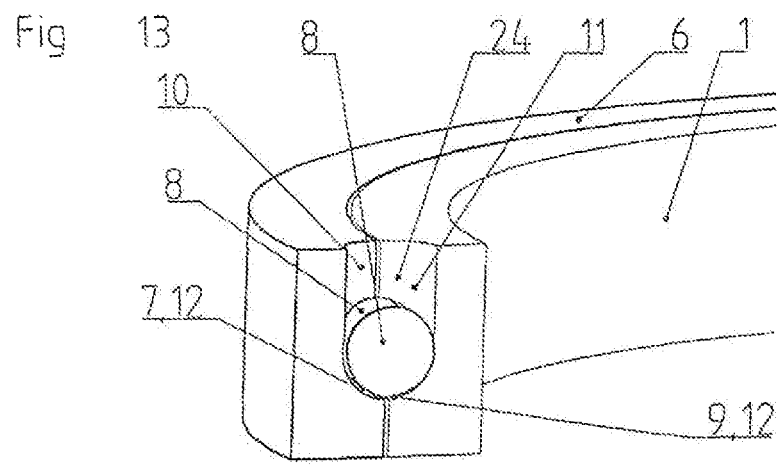

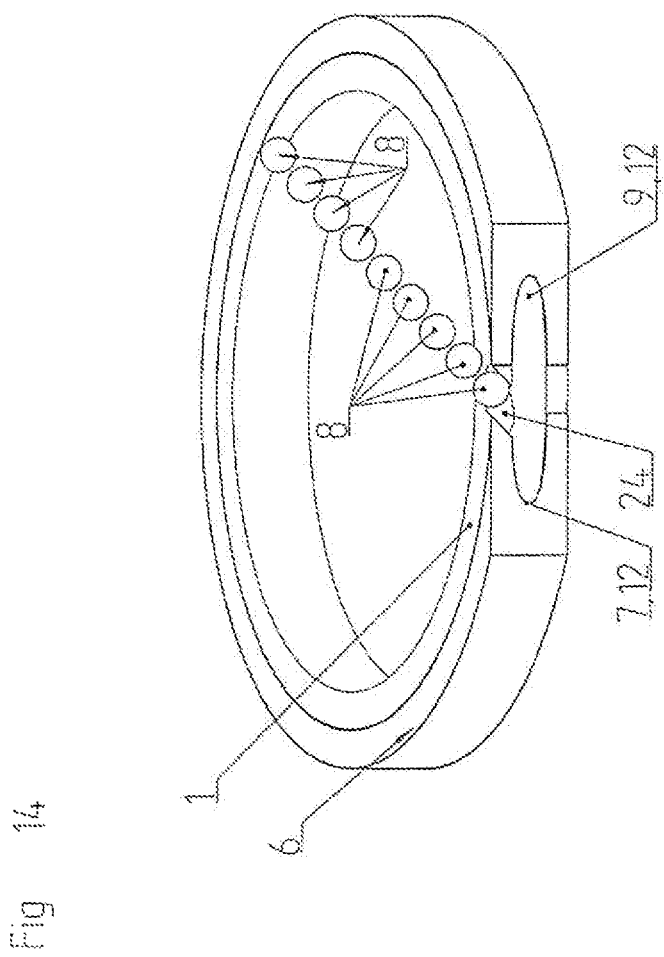

TRANSMISSION COMPONENT SET HAVING AN OUTPUT BEARING AND A HARMONIC DRIVE TRANSMISSION WHICH CAN BE MOUNTED THEREON

CROSS-REFERENCE TO RELATED APPLICATIONS

This application is a national stage application (under 35 USC § 371) of PCT/EP2016/055946, filed Mar. 18, 2016, which claims benefit of German application No. 10 2015 104 308.4, filed Mar. 23, 2015, the contents of each of which are incorporated by reference herein.

BACKGROUND OF THE INVENTION

Technical Field and State of the Art

The invention relates to a gear component set with an output bearing and a strain wave gear that can be mounted thereon.

Such gear component sets have multi-faceted applications in many realms of technology. In particular, such gear component sets are gaining widespread use in robotics as well as in prosthetics. For instance, reference can be made here to the Harmonic Drive® gear, which belongs to the group of strain wave gear systems and whose mode of operation is described by way of an example in https://harmonicdrive.de/de/technologie/harmonic-drive-wellgetriebe/ (in English: https://harmonicdrive.de/en/technology/harmonic-drive-strain-wave-gears/). The Harmonic Drive® gear can be configured with a conventional design as well as with a so-called flat design.

In the conventional design, the input component, which is configured there as an elliptical wave generator, uses a ball bearing to deform the transmission component, which is configured as an externally toothed flexspline that, in the opposing areas of the major axis of the ellipse, engages with the internally toothed gear wheel configured as a circular spline. As the wave generator rotates, the major axis of the ellipse shifts its position and so does the engagement area of the teeth. Since the flexspline of the Harmonic Drive® gear has two fewer teeth than the circular spline, the flexspline moves relative to the circular spline by one tooth during a half rotation of the wave generator and by two teeth during a full rotation. In the case of a fixed circular spline, the flexspline, as the output element, rotates counter to the input. In this context, the circular spline can be arranged so that it can be affixed to a bearing ring.

In the case of a flat design, the flexspline is configured as a thin-walled, elastically deformable ring that assumes an elliptical shape due to the wave generator. The external teeth engage with the internal teeth of the circular spline as well with the internal teeth of an additionally provided dynamic spline. The dynamic spline is an internally toothed ring gear having the same number of teeth as the flexspline. It rotates in the same rotational direction and at the same rotational speed as the flexspline and it is employed as the output element during speed-reduction operation.

It is particularly advantageous that Harmonic Drive® gears do not exhibit any increase in play in the teeth over the course of their entire service life and they display an outstanding positioning precision of less than one angular minute and a repeat precision of just a few angular seconds. Moreover, Harmonic Drive® gears are considerably more compact and more lightweight than conventional gears so that they are tailor-made for use in robotics, prosthetics and similar technical fields in which rotational movements have to be executed within extremely small spaces. Since the force transmission takes place over a large tooth engagement range, Harmonic Drive® gears can transmit higher torques than conventional gears can. With just three components, speed-reduction ratios of 30:1 to 320:1 are achieved in one stage. In the rated range, efficiencies of up to 85% are attained. Harmonic Drive® gears are not self-locking and do not exhibit any stick-slip behavior. Moreover, Harmonic Drive® gears have a high torsional stiffness over the entire torque range, displaying a virtually linear characteristic curve. Moreover, Harmonic Drive® gears offer the possibility to have a central hollow shaft. Thus, cables, shafts, laser beams, etc. can easily pass through the hollow shaft. Harmonic Drive® gears stand out for their high degree of reliability and long service life.

For purposes of executing a rotational movement between two components, such strain wave gears are placed onto a bearing ring, where they are mounted so as to be rotatable. Here, on the one hand, the gear wheel of the strain wave gear can be arranged non-rotatably relative to the bearing ring, whereby rolling elements are then arranged between bearing surfaces of the bearing ring and of the transmission component, as a result of which the rotatability of the strain wave gear relative to the bearing ring is ensured. On the other hand, the transmission component of the strain wave gear can also be arranged non-rotatably relative to the bearing ring, whereby rolling elements are then arranged between bearing surfaces of the bearing ring and of the gear wheel, as a result of which the rotatability of the strain wave gear relative to the bearing ring is likewise ensured.

Due to the conventional design of such gear component sets, robots, prostheses and other devices that employ such strain wave gears to execute rotational movements can be dimensioned relatively small. However, for some applications, these conventional gear component sets are still too large in terms of their axial dimensions and, furthermore, their mounting with a separate bearing ring is too laborious, so that they tend to be financially and technically unsuitable for such applications.

Japanese patent application JP 2010-127452 A discloses a harmonic drive for a robot application in which an anti-friction bearing is screwed to the gear wheel of the harmonic drive by means of bolts. The anti-friction bearing itself has an axial length that matches the axial length of the harmonic drive itself, so that this arrangement is unsuitable for the above-mentioned purposes.

German patent application DE 24 07 477 A1 discloses an anti-friction bearing as well as a method for its production. This publication describes rolling elements with end faces, in other words, rollers, and thus an anti-friction bearing that can be loaded radially. For the production of this anti-friction bearing, closure pieces are cut off from the flanges after the bearing rings have been completely machined, so that, without the need for any finishing work, they fit very precisely into filling openings created for the anti-friction bearings by the cutting procedure.

German patent DE 196 81 201 D4 discloses a torque detecting device for a flexible meshing-type gear.

German patent application DE 10 2007 025 353 A1 discloses a reduction gear unit with a rotational position sensor.

International patent application WO 2014/203295 A1 discloses a harmonic drive in which the gear wheel is mounted opposite from a bearing ring. In actual practice with such gears, a cross roller bearing is provided here in which rolling elements in the form of rollers are inserted into the raceway alternatingly in a perpendicular orientation with respect to each other. For this purpose, a filling opening that extends radially is provided through which the rollers are inserted manually in actual practice, so that they are arranged in the correct orientation in the raceway.

U.S. Pat. No. 6,050,155 discloses a Harmonic Drive® gear in which a separate anti-friction bearing is arranged on the gear wheel and screwed to it. Here, too, the arrangement of the separate anti-friction bearing increases the axial length of the entire gear unit.

U.S. Pat. No. 7,905,326 B2 discloses a rotating table device in which a strain wave gear transmits the rotational movement from a drive unit to the rotating table itself. Here, the externally toothed gear is non-rotatably joined to the rotating table. The rotating table, in turn, is mounted relative to the fixed gear wheel by means of a bearing mechanism, whereby the bearing mechanism is situated between the rotating table and the gear wheel but separately from both.

U.S. Pat. Appln. No. 2005/0135720 A1 discloses a cross roller bearing in which the rolling elements in the form of rollers are mounted crosswise in a raceway. As already described in conjunction with international patent application WO 2014/203295 A1, a filling opening that extends radially is provided for the rolling elements, said opening being radially closed with a plug once the rolling elements have been filled in.

German patent application DE 10 2009 005 020 T5 discloses a non-circular bearing for a harmonic generator of a harmonic drive, whereby a ball filling opening is configured on the outer circumferential rim of a stiff cam plate in an area above the minor axis of the oval where essentially no load occurs. It is from here that the balls are inserted into the race, after which the opening is sealed by a closure.

The mounting of such harmonic drives is altogether laborious, whereby the harmonic drives are large in size. For this reason, the prior-art gear component sets, which are equipped with a bearing ring and a strain wave gear that can be mounted on said ring, cannot be used to create robots and prostheses or other devices in which the rotational movements can be executed, even in extremely small installation spaces, in a manner that is financially and technically satisfactory.

SUMMARY OF THE INVENTION

Before this backdrop, it is an objective of the invention to refine a gear component set of the above-mentioned type in such a way that the axial length of the gear component set can be minimized, so that such gear component sets can be used even if only very little installation space is available in the axial direction for this purpose. It should also be ensured that the mounting of the gear component set is simple.

In this context, the gear component set has a bearing ring and a strain wave gear that can be mounted on said bearing ring. The strain wave gear consists essentially of an input component, a flexible transmission component provided with external teeth and a gear wheel provided with internal teeth. In the case of a gear component set having a flat design, a so-called dynamic spline is provided as the output component, which is configured as an internally toothed ring gear having the same number of teeth as the transmission component. Here, the external teeth engage simultaneously with the internal teeth of the gear wheel and with the internal teeth of the output component, so that a rotation of the transmission component caused by the engagement with the internally toothed gear wheel simultaneously brings about a rotational movement of the output component that is arranged coaxially to the gear wheel.

The transmission component can be placed onto the input component, whereby the transmission component can be elliptically deformed by the input component in such a way that the external teeth of the transmission component can be made to engage with the internal teeth of the gear wheel in opposing areas of a major axis of the ellipse. In this context, via its bearing surface, the gear wheel or the transmission component can be mounted by means of rolling elements on a bearing surface of the bearing ring. In this context, it is provided that the gear wheel or transmission component or else the bearing ring itself has the appropriate bearing surface, that is to say, the bearing surface is created in or formed onto the appertaining component. The invention is characterized in that the gear wheel or transmission component and the bearing ring are each provided with at least one indentation through which, when the two indentations are lined up in a corresponding position relative to each other, rolling elements can be inserted into an anti-friction bearing between the bearing surface of the gear wheel or transmission component and the bearing surface of the bearing ring. With a flat design, the bearing ring can be configured in one piece with the output component, so that in such a case, one of the two indentations can be provided on the bearing ring that is connected in one piece to the output component, in other words, on the output component itself.

The inventive configuration of the gear component set is able to provide a very compact and extremely flat design of such a gear component set that especially can be employed in miniaturized robotics and prosthetics, where there is normally only limited space to execute rotational movements. In this context, the rolling elements, whose primary function is to support the gear wheel on the bearing ring, can be easily placed—also in an automated process—into the anti-friction bearing between the bearing surface of the gear wheel or transmission component and the bearing surface of the bearing ring during the mounting of the gear component set. Towards this end, the two indentations of the gear wheel or transmission component and of the bearing ring are aligned relative to each other in such a way that they allow rolling elements to be inserted into the anti-friction bearing between the bearing surface of the gear wheel or transmission component and the bearing surface of the bearing ring via an axial end face of the gear component set. After the gear component set has been mounted, it can be placed between two components that are to be rotated counter to each other, for instance, two robot arms.

In this context, it has proven to be advantageous for the gear wheel or transmission component to have races for the rolling elements on its bearing surface and for the bearing ring to have races for the rolling elements on its bearing surface. Thanks to such races, the rolling elements can very suitably bring about a support between the bearing ring and the gear wheel or transmission component, whereby only very low friction forces occur between the bearing ring and the gear wheel or transmission component.

According to the invention, the rolling elements are configured here as balls which roll with very little friction on such raceways. Anti-friction bearings configured with such rolling elements and raceways can be very easily adapted to the specific applications in terms of their geometric size and shape. In particular, even very small balls and thus also very small indentations in the gear wheel or transmission component and in the bearing ring can be used here, and these balls roll on the races of the bearing ring and of the gear wheel or transmission component. Consequently, the use of small balls and indentations can already considerably reduce the axial dimensions of the bearing ring and of the gear wheel and hence of the entire gear component set.

In a refinement of the present invention, it can be provided that the shapes of the bearing surfaces or of the rolling elements are configured so as to build up a pre-tensioning of the bearing. In this context, the bearing is formed by the opposing bearing surfaces and by the rolling elements that run between them. In order to achieve an adaptation to different load states, a pre-tensioning is built up in the bearing, thereby improving the friction and wear behavior of the gear component set. For this purpose, the shape of the rolling elements and/or of the races, for example, the ball diameter, can be adapted in such a way that the bearing is pre-tensioned when it is in the mounted state.

In another embodiment of the gear component set according to the invention, it is provided that the indentations of the gear wheel or transmission component and of the bearing ring can be placed in a position of the transmission component relative to the gear wheel in such a way that the rolling elements are kept disengaged from the indentations in the races so as to prevent the balls from falling out. If the input component is used to drive the transmission component when the mounted gear component set is in such a position, then a movement of the transmission component also occurs here relative to the gear wheel since the rolling elements can roll on the races of the gear wheel or transmission component and of the bearing ring. If the race for the rolling elements is arranged on the transmission component, then the gear wheel is held non-rotatably relative to the bearing ring. However, if the race for the rolling elements is arranged on the gear wheel, then the transmission component is held non-rotatably relative to the bearing ring.

In a special embodiment of the invention, at least one closure element, preferably a plug, is provided with which at least one of the indentations of the gear wheel or transmission component or of the bearing ring can be closed. As a result, the indentations of the gear wheel or transmission component and/or of the bearing ring can be aligned with respect to each other so as to form a feed passage through which the anti-friction bearing can be filled with rolling elements between the gear wheel or transmission component and the bearing ring. After the anti-friction bearing has been filled, the indentations of the gear wheel or transmission component and/or of the bearing ring and thus the feed passage can be closed by such a closure element. In this manner, once the rolling elements have been filled in, they can be undetachably held in the anti-friction bearing arranged between the bearing surfaces of the gear wheel or transmission component and of the bearing ring.

The closure elements here are advantageously shaped in such a way that they precisely seal off one indentation so that the gear wheel or transmission component can be rotated relative to the bearing ring, thereby retaining the function of the wave strain gear. Such closure elements are inserted into and close off the indentations of the gear wheel or transmission component and of the bearing ring, said indentations being configured as feed passages for the rolling elements of the anti-friction bearing.

According to a special embodiment of the invention, the feed passages are configured so as to be parallel. In this context, the term "parallel" means that a center longitudinal axis of the appertaining feed passage runs parallel to the center longitudinal axis of the gear component set. On the other hand, these feed passages can also be configured in such a way that their center longitudinal axes intersect the center longitudinal axis of the gear component set. Another advantageous embodiment is conceivable in which the parallel center longitudinal axis of the feed passage is tilted tangentially.

Preferably, it can be provided that the transmission component or the gear wheel has an output component or is joined thereto, and it can be arranged non-rotatably relative to the bearing ring. In this manner, the speed-reduced rotational movement of the gear component set can be transmitted to the components situated downstream from it.

Preferably, it can be provided that the output component engages non-rotatably with the gear wheel or transmission component or else with the bearing ring. Such an engagement, which is preferably configured with a positive fit, makes it possible to transmit the rotational movement to the components situated downstream from it in a very simple manner.

Preferably, the output component has a toothing system extending in the axial direction which engages with a corresponding toothing system in the bearing ring. This makes it possible to very easily create the geometrical component structure which is needed for the engagement that has a positive fit.

Preferably, the output component can be arranged in the axial direction in the bearing ring, at least partially. This permits the design in terms of the axial length of the gear component set to be particularly compact.

In a preferred embodiment, it can be provided that the bearing ring is configured in one piece with the output component. This embodiment is especially well-suited for the so-called flat design of the Harmonic Drive® gear, in which a single component serves as the output component and, at the same time, assumes the function of the bearing ring.

In an embodiment of the invention, it can also be provided that the output component has internal teeth, especially with the same number of teeth as the transmission component, and preferably, the internal teeth engage with the external teeth of the transmission component. This makes it easily possible to reduce the axial length of the gear component set.

In a refinement of the invention, it can be provided that the bearing ring and the gear wheel or the transmission component, with their bearing surfaces and the rolling elements arranged therein, form a ball bearing, especially a radial ball bearing, that can preferably be stressed axially in opposite directions. In this manner, the gear component set can be dimensioned very specifically for different load states and it functions like a four-point bearing.

It can be preferably provided that the gear component set can be rotated during use by an angle <360°, preferably <270', especially ≤140°. Such an embodiment is particularly advantageous for applications in which rotational angles are desired that are less than one full rotation on the output side of the gear component set. This is especially advantageous when the gear component set according to the invention is used in the realms of robotics, microrobotics or prosthetics. The use of the gear component set with rotational angles amounting to less than one full rotation on the output side ensures that the rolling elements can no longer fall out of the bearing surface of their own accord after being mounted since the indentations do not line up with each other during operation and consequently no feed passage is created.

According to a particularly advantageous idea of the invention, the axial length of the gear component set or of the input component, of the transmission component or of the gear wheel is smaller than or equal to the axial length of the component having the greatest axial length. In this specific geometrical configuration, the axial length of the gear component set according to the invention is defined by the axial length of the component having the greatest axial length. All of the other components of the gear component set can then be arranged in such a way that none of the components of the gear component set projects beyond the axial length of the largest component.

Preferably, the transmission component is the component with the greatest length, especially in the case of a one-piece configuration with an output component formed thereon.

In order to achieve a very effective and precise movement of the transmission component relative to the gear wheel, it has proven advantageous for the geometry of the indentations of the gear wheel and of the bearing ring to correspond to the geometry of the rolling elements. Consequently, the rolling elements can be inserted without any play into the indentations of the gear wheel and of the bearing ring so that only the rolling elements intended for this purpose can be inserted into the anti-friction bearing between the bearing surfaces of the gear wheel or transmission component and of the bearing ring. If the rolling elements are spherical, the geometry of the bearing surfaces can preferably be round, especially in the form of segments of a circle.

Moreover, the strain wave gear of the gear component set according to the invention can be equipped with sensor units which can detect, for instance, the position or location of the individual elements of the strain wave gear or which can determine forces or torques and the like. For this purpose, it can especially be provided that the gear component set according to a variant of the above-mentioned description is characterized in that at least one sensor unit is provided which can detect the position or location of individual elements of the strain wave gear and/or which can determine forces or torques and the like.

Additional objectives, advantages, features and application possibilities of the present invention ensue from the description below of embodiments with reference to the figures. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown:

FIG. 9 an embodiment of a gear wheel of a gear component set according to the invention, in a perspective partial view;

FIG. 10 an embodiment of a bearing ring of a gear component set according to the invention, in a perspective partial view;

FIGS. 11-13 the gear wheel according to FIG. 9 and the bearing ring according to FIG. 10 in different depictions of a mounted position during the filling of the anti-friction bearing arranged between the gear wheel and the bearing ring;

FIG. 14 a second embodiment of a gear wheel and of a bearing ring of a gear component set according to the invention, in a detailed cross-sectional view.

DETAILED DESCRIPTION

Figure 1:
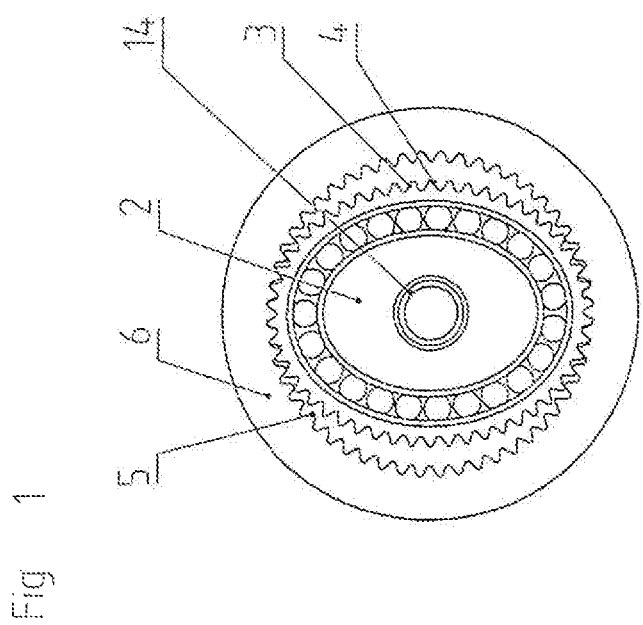
FIG. 1 an embodiment of the gear component set according to the invention, in its mounted state, in a top view along a center longitudinal axis of the gear component set.

FIG. 1 shows an embodiment of the gear component set according to the invention, in its mounted state, in a top view along a center longitudinal axis of the gear component set. In this context, a transmission component 4 configured as a flexspline is placed onto an input component 2 that is configured as an elliptical wave generator that is mounted on a hollow shaft 14, whereby the transmission component 4 is likewise elliptically deformed by the elliptical input component 2. In the opposing areas of the major axis of the ellipse, the external teeth 3 of the elliptically deformed transmission component 4 engage with the internal teeth 5 of a gear wheel 6 configured as a circular spline. The gear wheel 6 is mounted on a bearing ring 1 by means of a bearing ring that is not specifically designated here. In the top view of FIG. 1, the gear component set according to the invention does not differ essentially from the gear component sets known from the state of the art.

Figure 2:
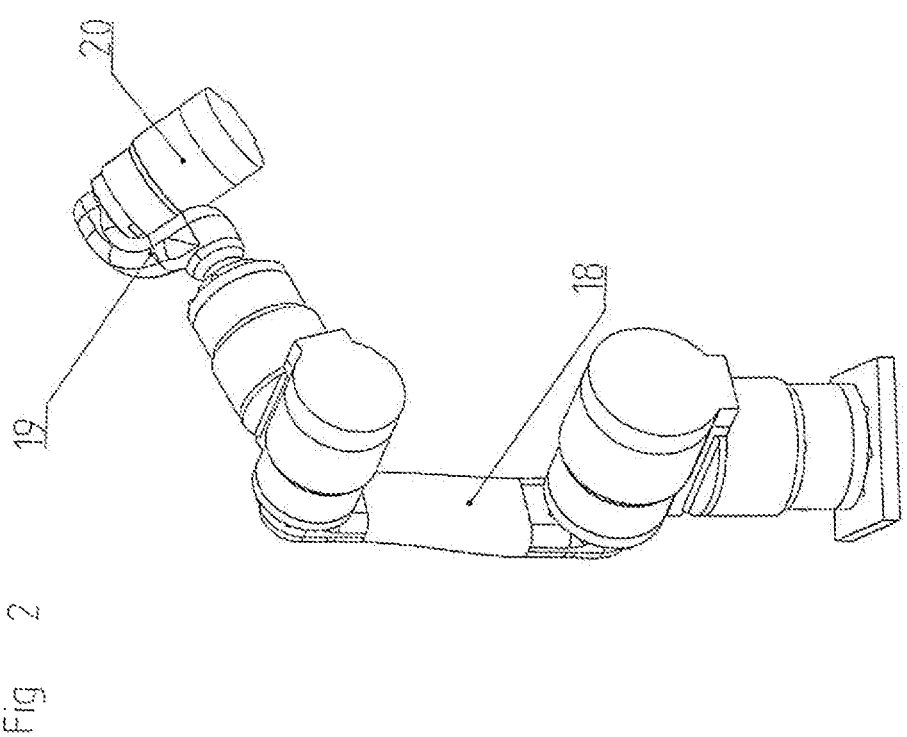
FIG. 2 a robot having a gear component set according to the invention, in a perspective view.
Figure 3:
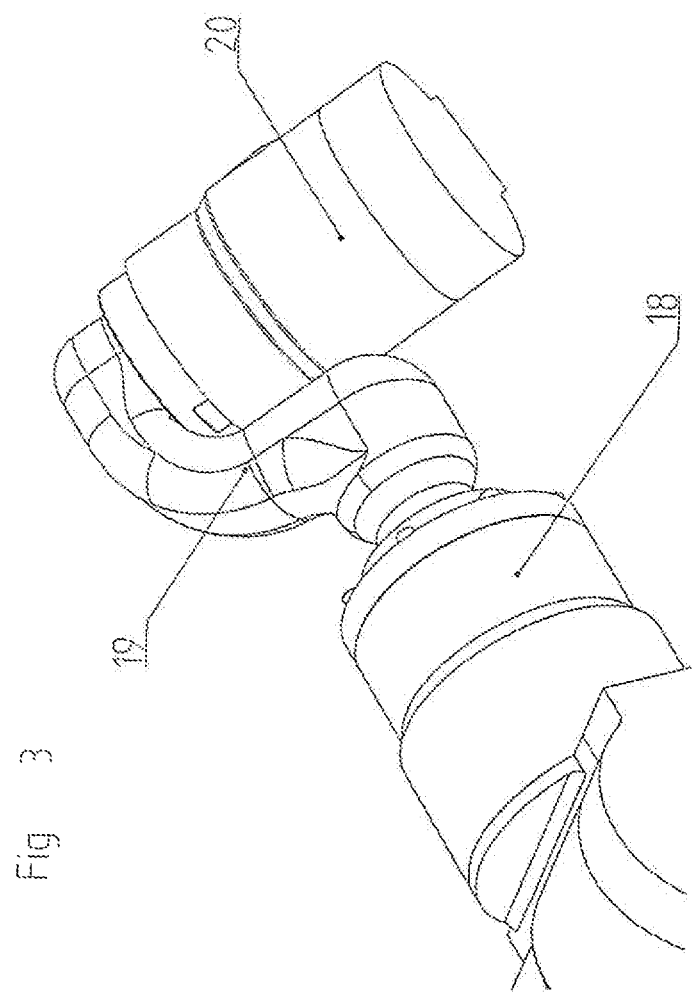
FIG. 3 a sectional view of the robot according to FIG. 2.

FIGS. 2 and 3 show a robot 18 with robot arms 19 and 20 which are held so that they can pivot with respect to each other and between which a gear component set according to the invention can be inserted. In this context, FIG. 2 shows the robot 18 in an overall view, whereas FIG. 3 shows a section of the robot 18 with the area between the first and second robot arms 19 and 20, respectively, where the gear component set according to the invention is employed. Of course, it is also possible to provide all of the articulations of the robot with such a gear component set, so that the robot can also execute rotations in all of the other robot axes by using a gear component set according to the invention.

Figure 4:
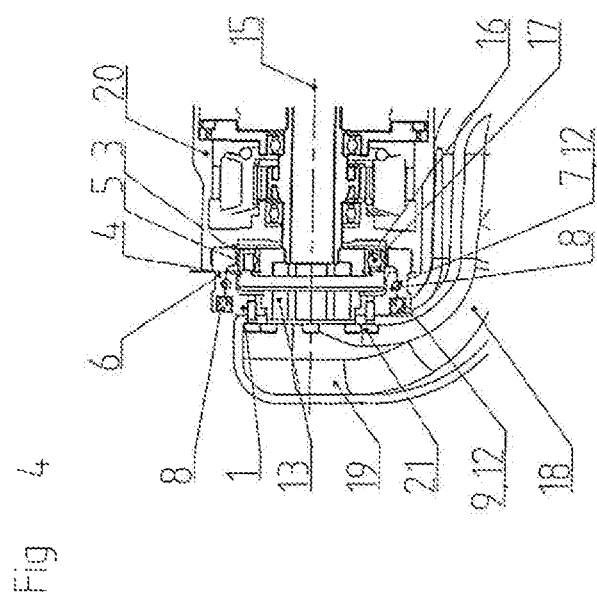
FIG. 4 a cross-sectional view of the section according to FIG. 3.
Figure 5:
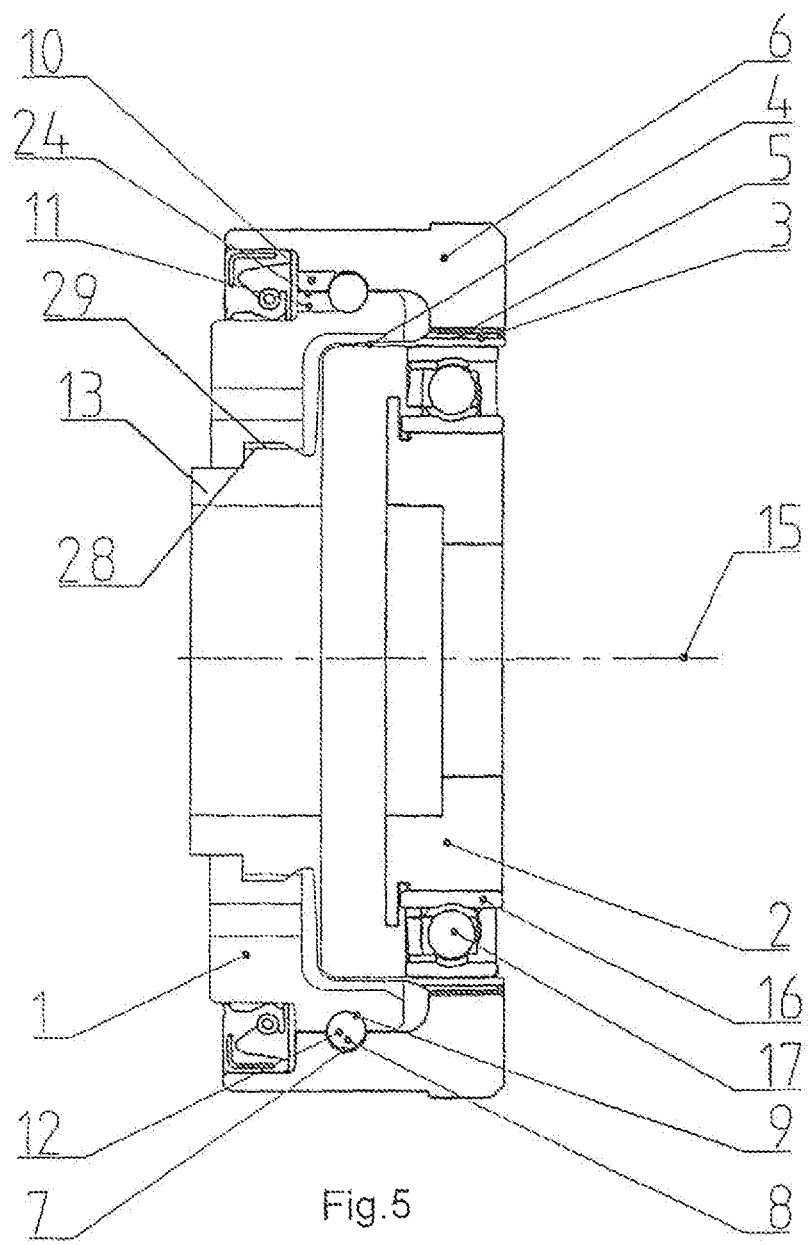
FIG. 5 a cross-sectional view of the gear component set used in the robot according to FIGS. 2 to 5.

The difference from the gear component sets known from the state of the art becomes quite evident when the gear component set according to the invention is shown in a side view perpendicular to a center longitudinal axis 15 of the gear component set, as is shown by way of an example in FIGS. 4 and 5.

Especially in FIG. 5, it can be seen that the transmission component 4 shown there with the output component 13 formed onto it exhibits the greatest axial extension of all of the components of the gear component set. However, the gear component set can also be configured in such a way that the gear wheel 6 has the greatest axial extension of all of the components. In the embodiment being described here, the input component 2 is configured as an elliptical wave generator. The flexible transmission component 4 configured as a flexspline is placed onto this input component 2 via a ball bearing 16 containing several balls 17. Owing to the flexibility in the area of the external teeth 3 of this transmission component 4, the latter is likewise elliptically deformed due to the elliptical shape of the input component 2.

Since the flexible transmission component 4 has external teeth 3 and is elliptically deformed, in the area of the major axis of the ellipse, these external teeth 3 engage with the internal teeth 5 of a gear wheel 6 configured as a circular spline. This gear wheel 6 has an inner surface configured as a bearing surface 9 which corresponds to an outer surface of a bearing ring 1 configured as a bearing surface 7. Here, an anti-friction bearing with a plurality of rolling elements 8 is arranged between these two bearing surfaces 7 and 9 of the gear wheel 6 and of the bearing ring 1, whereby the bearing surfaces 7 and 9 of the gear wheel 6 and of the bearing ring 1 are configured as races 12 for the rolling elements 8 of the anti-friction bearing. The rolling elements 8 are configured as balls in the present embodiment. In order to impart the bearing with a pre-tension, the shape of the rolling elements 8, especially their diameter, has to be adapted in such a way that the round bearing surfaces 7, 9 essentially correspond to said shape.

The rolling elements 8 are preferably in contact with the race at four points so as to functionally form a four-point bearing that can absorb axial loads in both directions as well as radial loads and tilting moments.

In order to implement the very narrow and compact design of the gear component set, an indentation 10 is made in the bearing surface 7 of the gear wheel 6, and an indentation 11 is made in the bearing surface 9 of the bearing ring 1. Both indentations 10, 11 correspond in such a way that, when they are appropriately oriented relative to each other, as shown, for example, in FIG. 5, they form a feed passage 24 and are thus suitable to accommodate a rolling element 8 with a positive fit. Since a rolling element 8 is accommodated with a positive fit, the anti-friction bearing between the gear wheel 6 and the bearing ring 1 can be filled with rolling elements 8 via the feed passage 24, so that the gear wheel 6 can be mounted particularly without play relative to the bearing ring 1, and the bearing ring 1 and the gear wheel 6 can be rotated counter to each other. In this position, the transmission component 4 configured as a flexspline can now be driven by means of an input component 2 that is configured as a wave generator, so that the gear wheel 6 can move relative to the transmission component 2.

Due to the fixation of the transmission component 4 to the bearing ring 1 by means of an output component 13, the gear wheel 6 rotates relative to the transmission component 4 in the present embodiment. The transmission component 4 in the present embodiment is non-rotatably joined to the bearing ring 1 by tooth engagement with a positive fit. In the present embodiment, the output component 13 is formed in one piece onto the transmission component 4.

The output component 13 arranged on the transmission component 4 can transmit the rotational movement of the transmission component 4 to other components which are situated within the device in which the gear component set is to be employed.

In the present embodiment, the races 12 created in the gear wheel 6 or in the bearing ring 1 are configured in such a way that the bearing can absorb radially active forces as well as axial loads along the center longitudinal axis 15 in both directions.

In the axial direction, the output component 13 is arranged at least partially inside the bearing ring 1 and, due to its radial tooth engagement with the bearing ring 1 along the circumference, it has a very space-saving design. The tooth engagement is effectuated via a toothing system 28 on the output component 13 which engages with a toothing system 29 located on the bearing ring 1.

It can also be clearly seen in FIG. 5 that the components of the gear component set, namely, the bearing ring 1, the input component 2, the output component 4 and the gear wheel 6, are arranged coaxially to a center longitudinal axis 15 of the gear component set.

Thanks to the embodiment of a rolling element 8 with a positive fit as described above as well as the indentations 10 and 11 in the gear wheel 6 and the bearing ring 1, it is now possible to provide a gear component set that is very compact and narrow in the axial direction and that is especially well-suited for use when there is only very little space available for executing rotational movements, as is particularly the case in many applications in the realms of robotics and prosthetics, whereby the gear component set is easy to mount.

FIG. 4 once again shows the gear component set of FIG. 5, although in a state where it has already been installed in a robot 18. It can be clearly seen that the axial installation space for the gear component set is very limited so that the gear component set according to the invention is especially suitable for applications in which there is only very little space available for executing rotational movements. Here, the output component 13 of the transmission component 4 is non-rotatably held on a first arm 19 of the robot 18 by means of screwed connections 21, together with the bearing ring 1, whereas the gear wheel 6 is non-rotatably joined to a second arm 20 of the robot 18.

Figure 6:
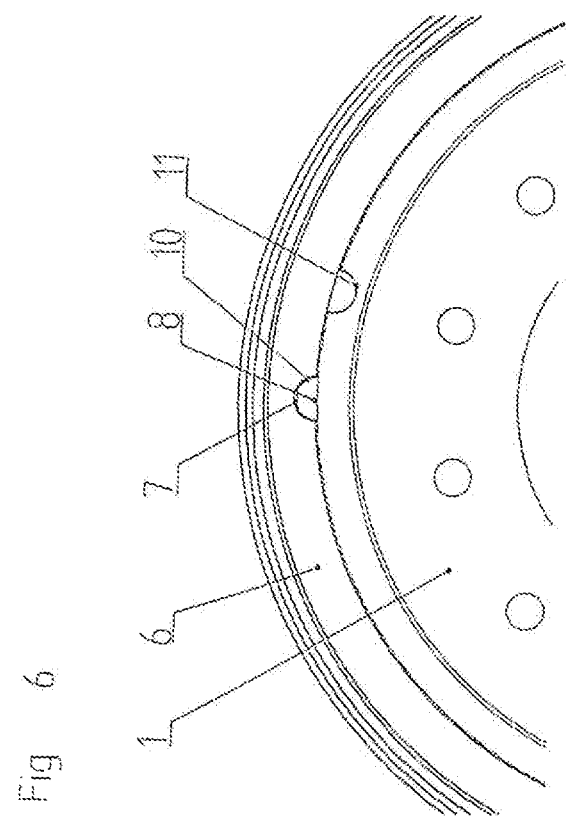
FIG. 6 a detailed view of a gear component set according to the invention, in a first position.
Figure 7:
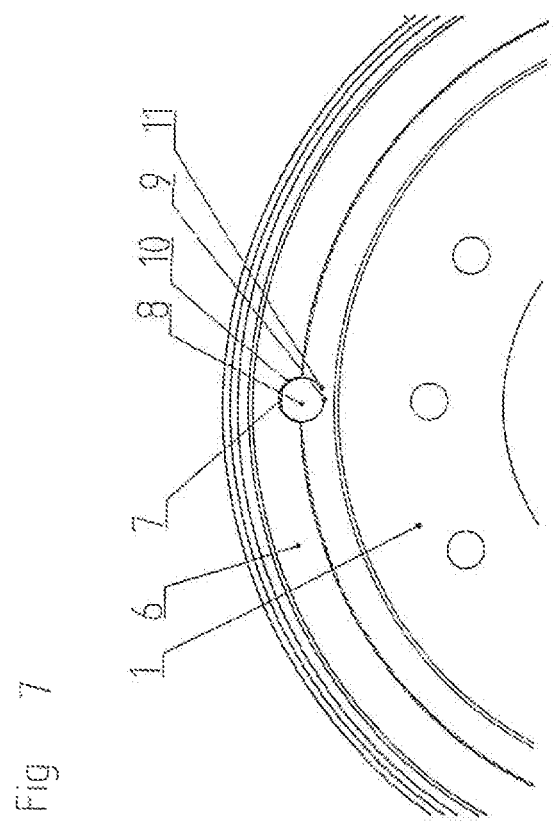
FIG. 7 a detailed view of a gear component set according to the invention, in a second position.

FIGS. 6 and 7 show two different positions of the indentations 10 and 11 of the gear wheel 6 and of the bearing ring 1.

The view shown in FIG. 6 depicts the indentations 10 and 11 of the gear wheel 6 and of the bearing ring 1 positioned in such a way relative to each other that they are not aligned with each other. Even if a rolling element 8 assumes a position that corresponds to the indentation 10 in the bearing surface 7 of the gear wheel 6, as is shown in FIG. 6, the rolling element 8 cannot enter this indentation 10 of the gear wheel 6 since, due to the absence of a corresponding indentation in the bearing surface 9 of the bearing ring 1, said rolling element 8 is forced to remain in the race 12 for the rolling elements 8. In this position, the gear wheel and the bearing ring can execute a movement relative to each other, so that a movement of the gear wheel 6 relative to the transmission component 4 occurs when the input component 2 is driven or rotated.

In contrast to this, in the view according to FIG. 7, the indentations 10 and 11 of the gear wheel 6 and of the bearing ring 1 are positioned with respect to each other in such a way that a rolling element 8 can be accommodated, at least partially. In this context, the indentations 10 and 11 of the gear wheel 6 and of the bearing ring 1 are configured in such a way that the rolling element 8 is accommodated with a positive fit, so that the bearing ring 1 and the gear wheel 6 can be affixed with respect to each other without any play. Another depiction of this positioning of the indentations 10 and 11 of the gear wheel 6 and of the bearing ring 1 is shown in FIG. 8.

Figure 8:
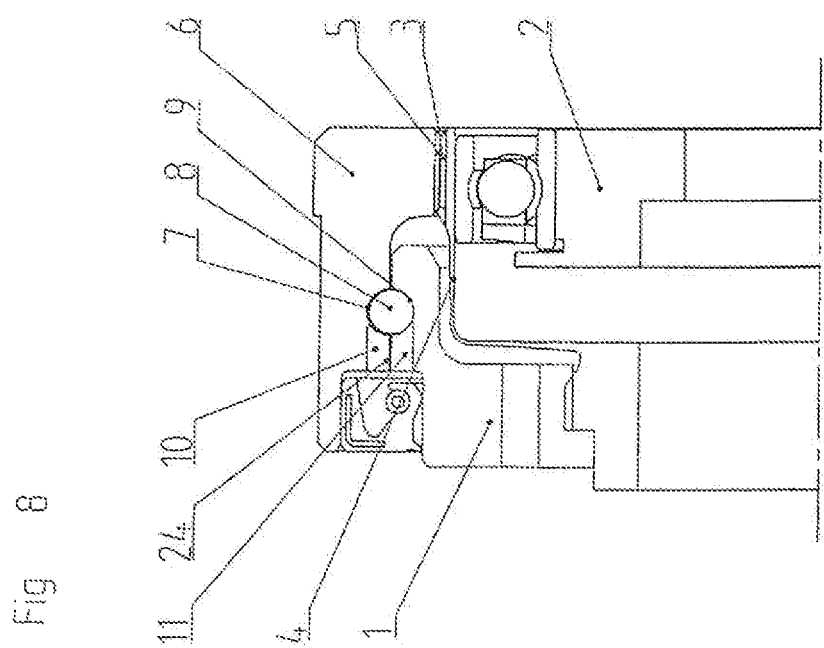
FIG. 8 a cross-sectional view of a gear component set according to the invention.

Here in FIG. 8, it can be clearly seen that, with this positioning of the indentations 10 and 11, the rolling element 8 can enter these indentations, whereby the bearing ring 1 and the gear wheel 6 are affixed with respect to each other without any play.

Closure elements 22, 23 can be provided in order to undetachably hold the rolling elements 8 that have been inserted through the feed passage 24 formed by indentations 10 and 11 of the gear wheel 6 and of the bearing ring 1 into the anti-friction bearing between the gear wheel 6 and the bearing ring. Such closure elements 22, 23 can be configured, for instance, as plugs 22, 23 that can be inserted into the feed passages 24 formed by the indentations 10 and 11. The feed passages 24, as shown in FIG. 8, are arranged in such a way that their center longitudinal axis runs parallel to the center longitudinal axis 15 of the gear component set. These plugs can only become necessary if rotational angles larger than or equal to 360° will be traversed on the output side of the gear component set. The plugs 22, 23 can be dispensed with in case of rotations of less than 360°, also because the indentations 10 and 11 do not line up with each other during operation so that the rolling elements 8 remain captured between the bearing surfaces 7, 9.

FIG. 9 shows an embodiment of a gear wheel 6 of a gear component set according to the invention, in a perspective partial view. Here, the inner surface of the gear wheel 6 is provided with a bearing surface 7 configured as a race 12 for rolling elements 8 (not shown here) of an anti-friction bearing arranged between the gear wheel 6 and a bearing ring 1. Moreover, the gear wheel 6 has an indentation 10 that can be closed by means of a closure element 22 configured as a plug 22. The cross sections of the plug 22 and of the indentation 10 have the same semicircular shape.

Analogously to this, FIG. 10 shows an embodiment of a bearing ring 1 of a gear component set according to the invention, in a perspective partial view. Here, the outside of the bearing ring 1 is provided with a bearing surface 9 configured as a race 12 for rolling elements 8 (not shown here) of an anti-friction bearing arranged between the gear wheel 6 and the bearing ring 1. Moreover, the bearing ring 1 has an indentation 11 that can be closed by means of a closure element 23 configured as a plug 23. The cross sections of the plug 23 and of the indentation 11 have the same semicircular shape and thus they match the shape of the plug 22 and of the indentation 10 of the gear wheel 6 shown in FIG. 9.

FIG. 11 shows the gear wheel 6 of FIG. 9 and the bearing ring 1 of FIG. 10 in a first mounted position while the anti-friction bearing situated between the gear wheel 6 and the bearing ring 1 is being filled with roller bearings 8. The positioning of the semicircular indentations 10 and 11 of the gear wheel 6 and of the bearing ring 1 with respect to each other can be clearly seen here, whereby they are not closed off with the plugs 22 and 23 and they form a feed passage for the rolling elements 8 of the anti-friction bearing situated between the gear wheel 6 and the bearing ring. In this context, the bearing ring 1 and the gear wheel 6 are configured such that their bearing surfaces 7 and 9, which are configured as races 12, allow the rolling elements 8 to roll without any play. In the depiction of FIG. 11, a rolling element 8 has already been inserted into the anti-friction bearing situated between the gear wheel 6 and the bearing ring 1, whereas another rolling element 8 shown in a cross-sectional view in this depiction is approaching the feed passage 24 formed by the indentations 10 and 11.

In the depiction of FIG. 12, the gear wheel 6 of FIG. 9 and the bearing ring 1 of FIG. 10 are shown in a second mounted position while the anti-friction bearing situated between the gear wheel 6 and the bearing ring 1 is being filled, whereby the rolling element 8 shown in a cross-sectional view has now already been inserted into the feed passage 24 formed by the indentations 10 and 11.

In the depiction of FIG. 13, the gear wheel 6 of FIG. 9 and the bearing ring 1 of FIG. 10 are shown in a third mounted position while the anti-friction bearing situated between the gear wheel 6 and the bearing ring 1 is being filled, whereby the rolling element 8 shown in a cross-sectional view has now already completely passed the feed passage 24 formed by the indentations 10 and 11 and is now positioned in the anti-friction bearing between the races 12 of the bearing surfaces 7 and 9 of the gear wheel 6 and of the bearing ring 1.

FIG. 14 shows a second embodiment of a gear wheel 6 and a bearing ring 1 of a gear component set according to the invention in a detailed cross-sectional view. This embodiment corresponds essentially to that of FIGS. 9 to 13 whereby, however, the feed passage 24 for the rolling elements 8 has been created so as to be slanted in the bearing ring 1 and in the gear wheel 6. As a result, when the rolling elements 8 are being filled into the race 12, they can utilize their own kinetic energy in order to distribute themselves in the race 12, which is delimited by the bearing surfaces 7 and 9 of the gear wheel 6 and of the bearing ring 1.

Figure 15:
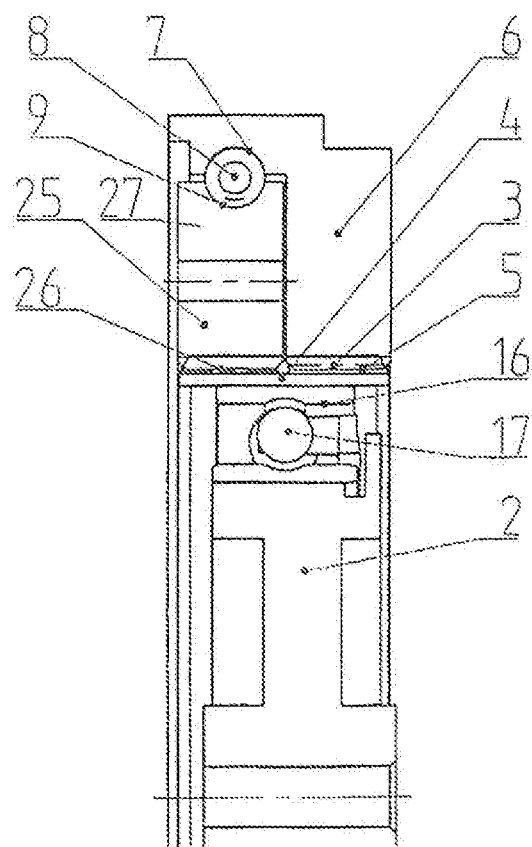
FIG. 15 another embodiment of a gear component set according to the invention, in a flat design.

FIG. 15 shows another embodiment of a gear component set according to the invention, in a flat design. In terms of its mode of operation, this gear component set essentially corresponds to the previously described embodiments. However, the component that corresponds to the transmission component 13 is configured here as a dynamic spline 25. This dynamic spline 25 has internal teeth 26 which, like the internal teeth 5 of the gear wheel 6, mesh with the external teeth 3 of the transmission component 4, which is configured as a flexspline.

A bearing surface 9 is formed on the dynamic spline 25 in which the rolling elements 8 can run in order to support the dynamic spline 25 on the gear wheel 6. The rolling elements 8 run on the gear wheel in a bearing surface 7 opposite to the bearing surface 9. The bearing surface 7 is shaped into the gear wheel 6. As a result, the function as well as the indentation 11 of the bearing ring 1 are integrated with the dynamic spline 25, thus also forming the output component 27 that corresponds to the transmission component 4 when the gear component set has a flat design.

In this embodiment, the axial length of the transmission component 4 extends beyond the axial extension of the internal teeth 5 of the gear wheel 6 as well as beyond the axial extension of the internal teeth 26 of the dynamic spline 25, whereby the external teeth 3 of the transmission component 4 each simultaneously engage with the internal teeth 5 of the gear wheel 6 as well as with the internal teeth 26 of the dynamic spline 25, so that the speed-reduced rotational movement caused by the input component 2 on the transmission component 4 is transmitted to the output component 27, and this, in turn, takes place because the external teeth 3 engage with the internal teeth 26 with a positive fit.

In the present embodiment, the gear wheel 6 is the component of the gear component set that displays the greatest axial extension.

LIST OF REFERENCE NUMERALS

1 bearing ring
2 input component
3 external teeth
4 transmission component
5 internal teeth
6 gear wheel
7 bearing surface
8 rolling element
9 bearing surface
10 indentation
11 indentation
12 race
13 output component 14 hollow shaft
15 center longitudinal axis
16 ball bearing
17 ball
18 robot
19 first robot arm
20 second robot arm
21 screw connection
22 closure element, plug
23 closure element, plug
24 feed passage
25 dynamic spline
26 internal teeth of the dynamic spline
27 output component
28 toothing system
29 toothing system

The invention claimed is:

1. A gear component set, comprising:
a bearing ring (1);
a strain wave gear adapted for mounting on said bearing ring, said strain wave gear comprising an input component (2), a flexible transmission component (4) provided with external teeth (3) and a gear wheel (6) provided with internal teeth (5), wherein the transmission component (4) is placed onto the input component (2) and is elliptically deformed by the input component (2) in such a way that the external teeth (3) of the transmission component (4) engage with the internal teeth (5) of the gear wheel (6) in opposing areas of a major axis of the ellipse, wherein the gear wheel (6) or the transmission component (4) has a bearing surface (7) and, via its bearing surface (7), the gear wheel or transmission component is mounted with spherical rolling elements (8) on a bearing surface (9) of the bearing ring (1), and wherein the gear wheel (6) or the transmission component (4) and the bearing ring (1) are each provided with at least one indentation (10, 11) through which, when the two indentations (10, 11) are lined up in a corresponding filling position relative to each other to create a feed passage (24), rolling elements (8) are insertable through the feed passage (24) into an anti-friction bearing between the bearing surface (7) of the gear wheel (6) or transmission component (4) and the bearing surface (9) of the bearing ring (1),
wherein the transmission component (4) or the gear wheel (6) has an output component (13, 27) or is joined to an output component (13, 27), which output component is arranged non-rotatably relative to the bearing ring (1); and
wherein the output component (13, 27) in the operating position is configured to be rotated by an angle smaller than 270° so that the two indentations (10, 11) do not line up to create the feed passage (24) and the rolling elements (8) are retained in the two indentations (10, 11) without inserting closure elements into the feed passage (24) of the two indentations (10, 11).

2. The gear component set according to claim 1, wherein the gear wheel (6) or the transmission component (4) defines a first race (12) for the rolling elements (8) on its bearing surface (7), and the bearing ring (1) defines a second race (12) for the rolling elements (8) on its bearing surface (9).

3. The gear component set according to claim 1, characterized in that the shapes of the bearing surfaces (7, 9) or of the rolling elements (8) are configured so as to build up a pre-tensioning of the bearing.

4. The gear component set according to claim 2, wherein the indentations (10, 11) of the gear wheel (6) or transmission component (4) and of the bearing ring (1) are adapted to be placed in a position of the transmission component (4) relative to the gear wheel (6) in such a way that the rolling elements (8) are kept disengaged from the indentations (10, 11) in the races (12).

5. The gear component set according to claim 1, wherein the output component (13, 27) engages non-rotatably with the gear wheel (6) or transmission component (4) or else with the bearing ring (1).

6. The gear component set according to claim 1 wherein the output component (13) has a toothing system extending in the axial direction which engages with a corresponding toothing system (28, 29) in the bearing ring (1).

7. The gear component set according to claim 1, wherein the output component (13) is arranged in the axial direction at least partially in the bearing ring (1).

8. The gear component set according to claim 1, wherein the bearing ring (1) is configured in one piece with the output component (27).

9. The gear component set according to claim 8, wherein the output component (27) has internal teeth (26) that engage with the external teeth (3) of the transmission component (4).

10. The gear component set according to claim 1, wherein the gear component set or of the input component (2), or the transmission component (4) or of the gear wheel (6) has an axial length is smaller than or equal to the axial length of the component (1, 2, 4, 6, 13) of the gear component having the greatest axial length.

11. The gear component set according to claim 1, wherein the indentations (10, 11) of the gear wheel (6) and of the bearing ring (1) have a geometry corresponding to a geometry of the rolling elements (8).

12. The gear component set according to claim 1, wherein the bearing ring (1), the gear wheel (6) or the transmission component (4), with their bearing surfaces (7, 9) and the spherical rolling elements (8) arranged therein, form a radial ball bearing adapted to be loaded axially in opposite directions.

13. A gear component set, comprising:
a bearing ring having a bearing surface and defining at least one receptacle or indentation adapted to receive rolling elements in said bearing surface;
a strain wave gear comprising an input component of elliptical shape defining an ellipse major axis, a flexible transmission component having external teeth, and a gear having internal teeth, wherein the flexible transmission component is fitted onto the input component and is elliptically deformable thereby such that the external teeth of the flexible transmission component engage with the internal teeth of the gear in opposing areas of the major axis of the ellipse, and with either the flexible transmission component or the gear having a bearing surface and defining in said bearing surface at least one receptacle or indentation adapted to receiving rolling elements; and
rolling elements insertable into the at least one receptacle or indentation of the bearing ring and the at least one receptacle or indentation of the flexible transmission component or the gear when the receptacles/indentations are lined up in corresponding position relative to each other in a filling position to define a feed passage, so that the gear or the flexible transmission component via its bearing surface is mountable on the bearing surface of the bearing ring;

wherein the flexible transmission component or the gear has an output component or is joined to an output component, which output component is arranged non-rotatably relative to the bearing ring;

wherein the output component in an operating position is configured to be rotated by an angle smaller than 360° so that the receptacles/indentations do not line up to create the feed passage and the rolling elements are retained in the receptacles/indentations without inserting closure elements into the feed passage.

14. The gear component set of claim 13, wherein the feed passage defines a center longitudinal axis, and the center longitudinal axis is oriented at a slant angle other than orthogonal to a center longitudinal axis of the receptacle or indentation of the transmission component or the gear.

* * * * *